US008400983B2

(12) United States Patent
Nakagawa et al.

(10) Patent No.: US 8,400,983 B2
(45) Date of Patent: Mar. 19, 2013

(54) COMMUNICATION SYSTEM AND METHOD, AND GATEWAY

(75) Inventors: Hiroto Nakagawa, Tokyo (JP); Koji Watanabe, Kawasaki (JP); Yosuke Takahashi, Kawasaki (JP); Yuichiro Katsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 13/103,718

(22) Filed: May 9, 2011

(65) Prior Publication Data
US 2011/0280215 A1 Nov. 17, 2011

(30) Foreign Application Priority Data

May 12, 2010 (JP) ................................. 2010-110089

(51) Int. Cl.
H04W 4/00 (2009.01)
(52) U.S. Cl. ...................................................... 370/331
(58) Field of Classification Search ........................ None
See application file for complete search history.

(56) References Cited

U.S. PATENT DOCUMENTS

| 2007/0165655 | A1 | 7/2007 | Haumont |
| 2009/0043902 | A1* | 2/2009 | Faccin ........................ 709/229 |
| 2009/0245201 | A1* | 10/2009 | Motegi et al. .................. 370/331 |
| 2010/0027448 | A1* | 2/2010 | Puthiyandyil et al. ........ 370/310 |
| 2011/0096660 | A1* | 4/2011 | Ikeda et al. ................... 370/225 |
| 2011/0211557 | A1* | 9/2011 | Cheng et al. .................. 370/331 |
| 2011/0286429 | A1* | 11/2011 | Vikberg et al. ................ 370/331 |
| 2012/0026979 | A1* | 2/2012 | Rommer et al. .............. 370/331 |
| 2012/0093167 | A1* | 4/2012 | Velandy et al. ............... 370/401 |

OTHER PUBLICATIONS

General Packet Radio Service (GPRS) Enhancements for Evolved Universal Terrestrial Radio Access Network (E-UTRAN) Access (Release 9); 3GPP TS 23.401 V9.3.0 (Dec. 2009); pp. 1-8, 14-45.
Architecture enhancements for non-3GPP accesses (Release 9); 3GPP TS 23.402 V9.3.0 (Dec. 2009); pp. 1-8, 13-48.
Perkins, C; IP Mobility Support; IETF RFC2002; Oct. 1996; pp. 1-13.
Johnson, D., et al.; Mobility Support in IPv6; IETF RFC3775; Jun. 2004; pp. 1-18.
Soliman, H.; Mobile IPv6 Support for Dual Stack Hosts and Routers; IETF RFC 5555; Jun. 2009; pp. 1-11.
Gundavelli, S. et al.; Proxy Mobile IPv6; IETF RFC 5213; Aug. 2008; pp. 1-16.

* cited by examiner

Primary Examiner — Otis L Thompson, Jr.
(74) Attorney, Agent, or Firm — Foley & Lardner LLP

(57) ABSTRACT

To realize a handover in which a gateway connecting to the access networks using different protocols is an anchor.
In a communication system, the gateway holds a service identifier management table for converting a service identifier of different kind with the protocol into a PDN identifier, and at the time of handover, specifies a session to be held with the user identifier and the PDN identifier, selects the same PDN connected to the movement source, and reassigns the same IP address that has been already assigned at the movement source.

20 Claims, 12 Drawing Sheets

| SERVICE IDENTIFIER | PDN IDENTIFIER |
|---|---|
| NAI# 1 | PDN# 1 |
| NAI# 2 | PDN# 2 |
| NAI# 3 | PDN# 1 |
| . . . | . . . |

| SERVICE IDENTIFIER | PDN IDENTIFIER |
|---|---|
| APN#1 | PDN# 1 |
| APN#2 | PDN# 2 |
| . . . | . . . |

| USER IDENTIFIER | SERVICE IDENTIFIER | PDN IDENTIFIER | IP ADDRESS | PROTOCOL |
|---|---|---|---|---|
| IMSI#1 | NAI#1 | PDN#1 | A | MIPv4 |
| IMSI#2 | NAI#1 | PDN#1 | B | MIPv4 |
| ... | ... | ... | ... | |

FIG.12

COMMUNICATION SYSTEM AND METHOD, AND GATEWAY

CLAIM OF PRIORITY

The present application claims priority from Japanese patent application JP 2010-110089 filed on May 12, 2010, the content of which is hereby incorporated by reference into this application.

BACKGROUND OF THE INVENTION

1. Field of the Invention

The present invention relates to a communication system and a communication method, and a gateway.

2. Description of the Related Art

In an Long Term Evolution (LTE) as defined by a Third Generation Partnership Project (3GPP), a Packet data network-Gateway (P-GW) has a function of connecting to an external IP network (hereinafter a Packed Data Network (PDN)), and a protocol for controlling the movement of a mobile terminal uses a GPRS Tunnelling Protocol (GTP). Also, in a mobile IPv4 (MIPv4), a Mobile IPv6 (MIPv6), and a Dual Stack Mobile IPv6 (DSMIPv6) as defined by an Internet Engineering Task Force (IETF), a Home Agent (HA) has a function of connecting to the PDN, and in a Proxy Mobile IPv6 (PMIPv6), a Local Mobility Anchor (LMA) has a function of connecting to the PDN. The HA is used in a communication system as defined by a 3GPP2 and a communication system as defined by a WiMAX forum. Also, the LMA is defined as one of the P-GW functions in the 3GPP. In those specifications, it is basic that an entity having a function of connecting to the PDN assigns the IP address of the mobile terminal.

The operator who operates a plurality of different communication systems may pack a function of connecting to the PDN in one gateway to enable the reduced installation costs and a handover between different communication systems. Also, the operator may manage an address pool separately for each PDN. The address pool is a set of IP addresses assigned to the mobile terminal.

FIG. 1 shows one example of a network configuration view.

This network includes a mobile terminal 101, access networks 102, 103 including a base station or the like, a Foreign Agent (FA) 104 for integrating the access networks and performing the data transfer to an HA 107, a Serving Gateway (S-GW) 105 for integrating the access networks and performing the data transfer to a P-GW 108, and a gateway 106 having the HA 107 and the P-GW 108. The gateway 106 is connected via each PDN #1 to #3 109 to each server #1 to #3 110 in various kinds of protocol.

PRIOR ART

[non-patent document 1] 3GPP TS 23.401 V9.3.0 (2009-12) 4

[non-patent document 2] 3GPP TS 23.402 V9.3.0 (2009-12) 4

[non-patent document 3] IETF RFC2002 IP Mobility Support (1996-10) 1

[non-patent document 4] IETF RFC3775 Mobility Support in IPv6(2004-6) 4

[non-patent document 5] IETF RFC5555 Mobile IPv6 Support for Dual Stack Hosts and Routers (2009-6) 2

[non-patent document 6] IETF RFC5213 Proxy Mobile IPv6 (2008-8)

SUMMARY OF THE INVENTION

In the present specifications or related art, a method was defined of realizing the gateway in the handover between different communication systems by using the PMIPv6 in the different communication systems. However, there was no description of using the different protocols.

In the light of the above-mentioned problems, it is an object of the invention to realize a handover in which the gateway connecting to the access networks using different protocols is an anchor.

In order to accomplish the object, there is provided a data network (PDN, etc.) selection method of enabling the gateway to connect to the same data network like PDN as connected in a communication system of movement source, without depending on the protocols used by the communication systems of movement source and movement target, to continue the service used in the communication system of movement source, in making the handover in which the gateway connecting to the access networks using different protocols is the anchor.

It is another object of the invention to provide an IP address assignment method of enabling the gateway to reassign the same IP address as assigned in the communication system of movement source, without depending on the protocols used by the communication systems of movement source and movement target, to continue the service used in the communication system of movement source, in making the handover in which the gateway connecting to the access networks using the different protocols is the anchor.

It is a further object of the invention to provide a session information management method of enabling the gateway to connect to the same PDN as connected in the communication system of movement source, without depending on the protocols used by the communication systems of movement source and movement target, to continue the service used in the communication system of movement source, and enabling the PDN to be selected without depending on the kind of service identifier for identifying the PDN for connection, in making the handover in which the gateway connecting to the access networks using the different protocols is the anchor.

Means for accomplishing the above objects is a communication system including a mobile terminal, an access network including a base station, an FA, an S-GW, a PDN, a network interface with the PDN, a P-GW for holding the network interface with the S-GW, an HA for holding the network interface with the FA, a storage part for storing a session information management table, and a gateway having a control part for making an IP address assignment process, for example, in which the gateway holds a service identifier management table for converting a service identifier into a PDN identifier, for example, to generalize the service identifier of different kind with the protocol, which is used to identify the PDN for connection as one of the session information management tables. However, to enable the handover between the communication systems using the different protocols and the different kinds of service identifiers, the gateway is set up to convert the different service identifiers into the same PDN identifier.

Also, in the communication system, the gateway holds a PDN information management table for setting the correspondence between the PDN identifier and a pool identifier for identifying an address pool, for example, to enable the address pool corresponding to the PDN for connection to be set as one of the session information management tables.

Also, in the communication system, the gateway, if receiving a signaling requesting the IP address assignment from the mobile terminal at the time of new connection, converts the service identifier set in the signaling into the PDN identifier, using the service identifier management table, decides the PDN for connection, and creates a connecting session management table with a combination of the user identifier set in the signaling, for example, an International Mobile Subscriber Identity (IMSI) and the PDN identifier.

Also, in the communication system, the gateway, if receiving a signaling requesting the IP address assignment from the mobile terminal at the time of new connection, decides the PDN identifier as previously described, decides a pool identifier corresponding to the PDN identifier, using the PDN information management table, selects the address pool corresponding to the PDN for connection, assigns the IP address, and adds it to the connecting session management table.

Also, in the communication system, the control part of the gateway, if receiving a signaling requesting the IP address assignment from the mobile terminal in making the handover in which the gateway connecting to the communication access networks using the different protocols is the anchor, converts the service identifier set in the signaling into the PDN identifier, as previously described. The gateway searches the connecting session management table for the same session with a combination of the user identifier set in the signaling and the PDN identifier, and upon detecting the same session, assigns the IP address assigned to the concerned session at the handover source.

According to the first solving means of the present invention, there is provided a communication system comprising:

a first access network, to which a terminal is connected, using a first protocol;

a second access network, to which a terminal is connected, using a second protocol different from the first protocol;

a network connected to a server providing a service; and a gateway, to which the first and second access networks and the network are connected, for connecting a session with the network and the first or second access network;

the gateway comprising:

a first service identifier management table storing a network identifier for common use in the first and second protocols, corresponding to a first service identifier for use in the first protocol to identify a service provided to the terminal from the network;

a second service identifier management table storing a network identifier for common use in the first and second protocols, corresponding to a second service identifier, which is different kind from the first service identifier, for use in the second protocol;

a network information management table setting the correspondence between the network identifier and an address pool identifier;

a connecting session management table storing associated a user identifier, a service identifier, a network identifier, an address and a protocol identification information for a connecting session; and a control part for controlling a session with the network and the first or second access network by accessing to the first and second service identifier management table, the network information management table and the connecting session management table;

wherein the control part of the gateway:

receives a signaling including a user identifier, a service identifier and a protocol identification information for identifying a protocol for use and requesting the address assignment, from the terminal;

searches the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;

if the information of the first connecting session is not stored, converts the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

searches the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and if the information of the second connecting session is stored, rewrites the service identifier and the protocol identification information in the information of the second connecting session, and returns a signaling in which an address in the information of the second connecting session stored in the connecting session management table is set, to the terminal;

thereby providing a service from the network via the first or second access network to the terminal.

According to the second solving means of the present invention, there is provided a communication method in a communication system comprising:

a first access network, to which a terminal is connected, using a first protocol;

a second access network, to which a terminal is connected, using a second protocol different from the first protocol;

a network connected to a server providing a service; and a gateway, to which the first and second access networks and the network are connected, for connecting a session with the network and the first or second access network;

the gateway comprising:

a first service identifier management table storing a network identifier for common use in the first and second protocols, corresponding to a first service identifier for use in the first protocol to identify a service provided to the terminal from the network;

a second service identifier management table storing a network identifier for common use in the first and second protocols, corresponding to a second service identifier, which is different kind from the first service identifier, for use in the second protocol;

a network information management table setting the correspondence between the network identifier and an address pool identifier;

a connecting session management table storing associated a user identifier, a service identifier, a network identifier, an address and a protocol identification information for a connecting session; and a control part for controlling a session with the network and the first or second access network by accessing to the first and second service identifier management table, the network information management table and the connecting session management table;

wherein the control part of the gateway:

receives a signaling including a user identifier, a service identifier and a protocol identification information for identifying a protocol for use and requesting the address assignment, from the terminal;

searches the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;

if the information of the first connecting session is not stored, converts the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

searches the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and if the information of the second connecting session is stored, rewrites the service identifier and the protocol identification information in the information of the second connecting session, and returns a signaling in which an address in the information of the second connecting session stored in the connecting session management table is set, to the terminal;

thereby providing a service from the network via the first or second access network to the terminal.

According to the third solving means of the present invention, there is provided a gateway, to which a first and second access networks and are network are connected, for connecting a session with the network and the first or second access network; the first access network, to which a terminal is connected, using a first protocol; and the second access network, to which a terminal is connected, using a second protocol different from the first protocol;

a network connected to a server providing a service; comprising:

a first service identifier management table storing a network identifier for common use in the first and second protocols, corresponding to a first service identifier for use in the first protocol to identify a service provided to the terminal from the network;

a second service identifier management table storing a network identifier for common use in the first and second protocols, corresponding to a second service identifier, which is different kind from the first service identifier, for use in the second protocol;

a network information management table setting the correspondence between the network identifier and an address pool identifier;

a connecting session management table storing associated a user identifier, a service identifier, a network identifier, an address and a protocol identification information for a connecting session; and a control part for controlling a session with the network and the first or second access network by accessing to the first and second service identifier management table, the network information management table and the connecting session management table;

wherein the control part of the gateway:

receives a signaling including a user identifier, a service identifier and a protocol identification information for identifying a protocol for use and requesting the address assignment, from the terminal;

searches the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;

if the information of the first connecting session is not stored, converts the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

searches the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and if the information of the second connecting session is stored, rewrites the service identifier and the protocol identification information in the information of the second connecting session, and returns a signaling in which an address in the information of the second connecting session stored in the connecting session management table is set, to the terminal;

thereby providing a service from the network via the first or second access network to the terminal.

According to the present invention, it is possible to realize a handover in which the gateway connecting to the access networks using different protocols is an anchor.

Also, according to the present invention, it is possible to provide a data network (PDN, etc.) selection method of enabling the gateway to connect to the same data network like PDN as connected in a communication system of movement source, without depending on the protocols used by the communication systems of movement source and movement target, to continue the service used in the communication system of movement source, in making the handover in which the gateway connecting to the access networks using different protocols is the anchor.

Also, according to the present invention, it is possible to provide an IP address assignment method of enabling the gateway to reassign the same IP address as assigned in the communication system of movement source, without depending on the protocols used by the communication systems of movement source and movement target, to continue the service used in the communication system of movement source, in making the handover in which the gateway connecting to the access networks using the different protocols is the anchor.

Also, according to the present invention, it is possible to provide a session information management method of enabling the gateway to connect to the same PDN as connected in the communication system of movement source, without depending on the protocols used by the communication systems of movement source and movement target, to continue the service used in the communication system of movement source, and enabling the PDN to be selected without depending on the kind of service identifier for identifying the PDN for connection, in making the handover in which the gateway connecting to the access networks using the different protocols is the anchor.

BRIEF DESCRIPTION OF THE DRAWINGS

FIG. 8 is one example of a service identifier management table (NAI).

FIG. 11 is one example of a service identifier management table (APN).

FIG. 12 is one example of a connecting session management table (after update).

DETAILED DESCRIPTION OF THE PREFERRED EMBODIMENTS

Figure 1:
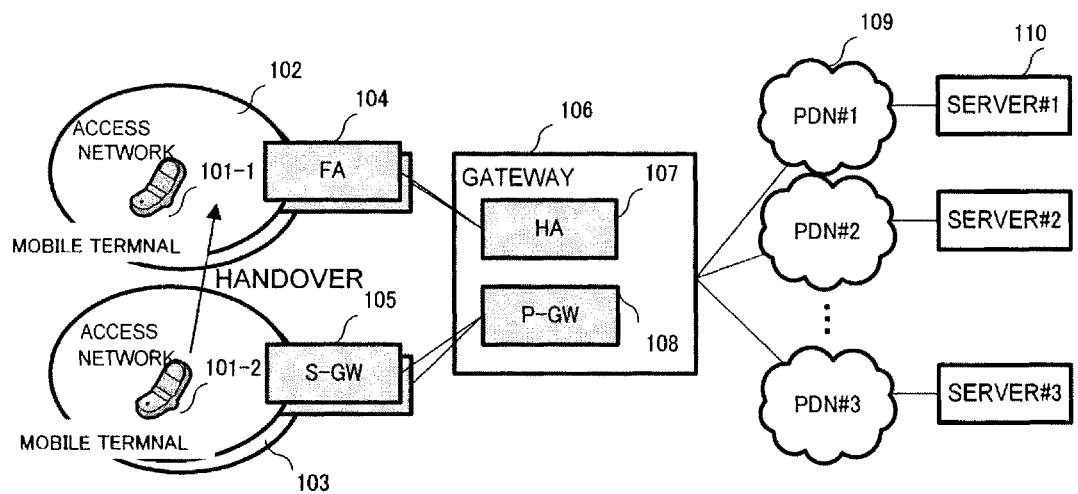
FIG. 1 is one example of a network configuration view.

1. System One example of a network configuration is the same as explained in FIG. 1.

2. Gateway (One Example of Gateway Block Configuration)

Figure 5:
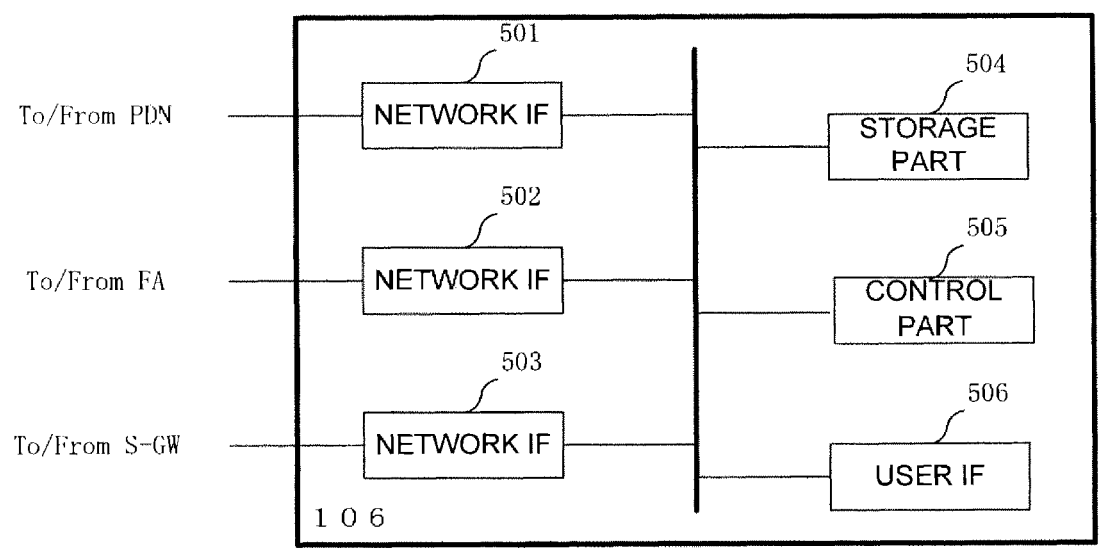
FIG. 5 is one example of a gateway block configuration view.

FIG. 5 is one example of a gateway block configuration view according to this embodiment.

A gateway 106 includes a network IF 501 connected to a PDN, a network IF 502 connected to an FA, a network IF 503 connected to an S-GW, a storage part 504, a control part 505, and a user IF 506. The network IF 501 is the network interface with a core network such as PDN. The network IF 502 is the network interface with the FA. The network IF 503 is the network interface with the S-GW. The control part 505 performs a PDN selection process and an IP address assignment process in accordance with a flow as will be described later.

If the gateway 106 can distinguish from which entity the signaling is sent, it is unnecessary that the network IF 502 and the network IF 503 are separately provided. For example, the gateway can distinguish the protocol with information within the received signaling. In this example, though an FA 104 and an S-GW 105 will be described below as the access networks, any number of appropriate access networks may be further connected.

Figure 7:
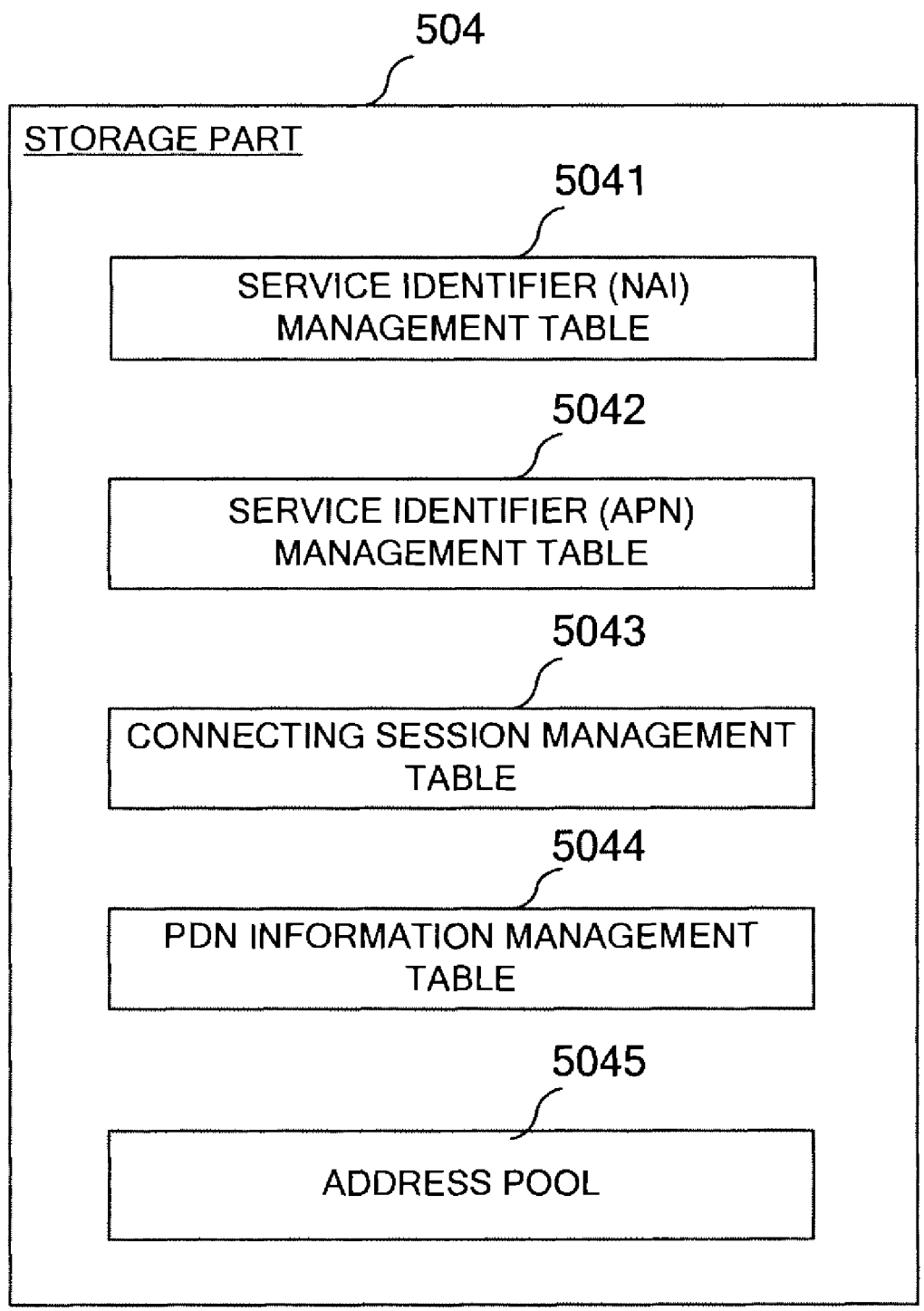
FIG. 7 is one example of information set in a gateway storage part.

FIG. 7 shows one example of information set in a gateway storage part. The storage part 504 has a service identifier (NAI) management table 5041 and a service identifier (APN) management table 5042 that are set up beforehand by the operator, and a connecting session management table 5043 that is set by the gateway at the time of establishing the session, for example, as shown in FIG. 7. Also, a PDN management table 5044 and an address pool 5045, for example, are set up beforehand by the operator.

FIG. 8 shows one example of the service identifier management table (NAI). The service identifier (NAI) management table 5041 stores the PDN identifier for each service identifier (e.g., NAI).

FIG. 11 shows one example of the service identifier management table (APN). The service identifier (APN) management table 5042 stores the PDN identifier for each service identifier (e.g., APN).

Figure 9:
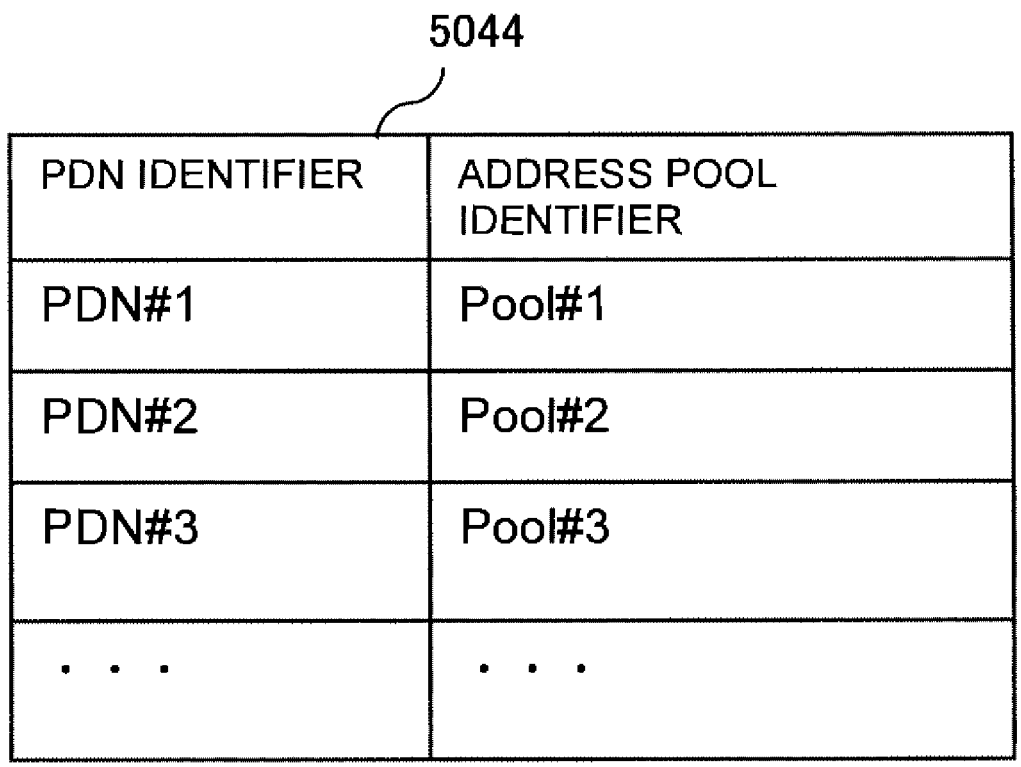
FIG. 9 is one example of a PDN information management table.

FIG. 9 shows one example of the PDN information management table. The PDN information management table 5044 stores an address pool identifier for each PDN identifier. The address pool 5045 pools a plurality of IP addresses for each address pool identifier.

Figure 10:
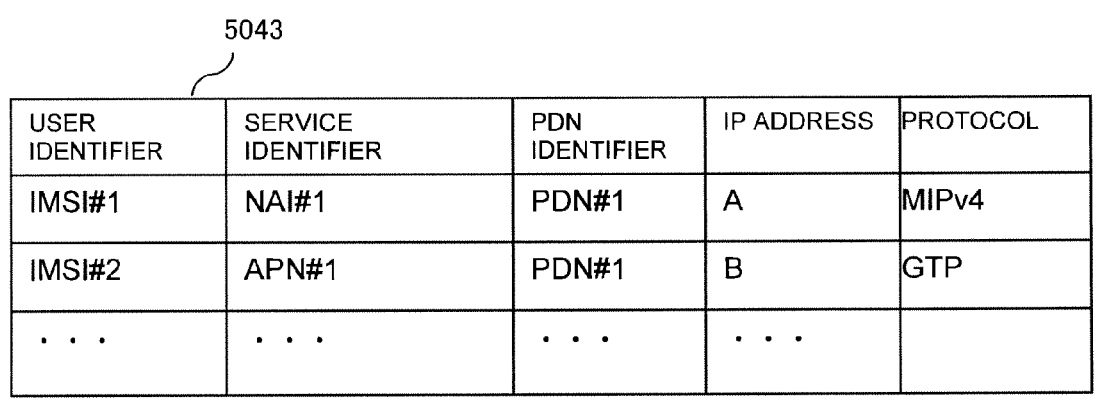
FIG. 10 is one example of a connecting session management table.

FIG. 10 shows one example of the connecting session management table. The connecting session management table (5043) stores the PDN identifier, the IP address and the protocol assortment of connecting session for the user identifier and the service identifier.

Also, FIG. 12 shows one example of the connecting session management table (after update).

3. Operation

[Embodiment 1: New Connection: One Example of Connection from the FA]

Figure 2:
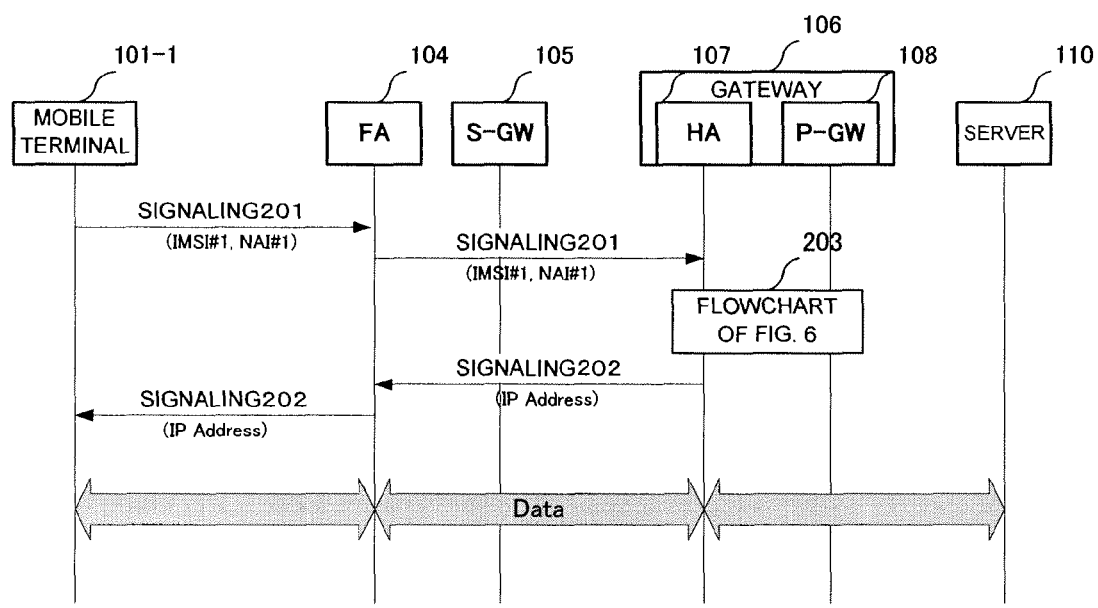
FIG. 2 is one example of new connection: connection from FA (embodiment 1).

FIG. 2 shows one example of a call flow for new connection from the FA 104.

A signaling sent from a mobile terminal 101-1 or 101-2 includes a user identifier, a service identifier and the protocol identification information for identifying the protocol. Herein, the user identifier is identification information for identifying the terminal used by the user of a mobile terminal 101 or the like, but may be identification information for identifying the user himself, or both of them. Also, the service identifier is identification information for identifying each service in providing various kinds of service that each user or each terminal offers, and/or identification information for identifying each service in providing various kinds of service to each user or each terminal. Also, the different service identifier may be used depending on the protocol used by each access network 102. Even when the same service is provided by the same PDN 109, a case of using the service identifier of different kind may be supposed depending on the protocol. The service identifiers include Access Point Name (APN) and Network Access Identifier (NAI), for example.

The mobile terminal 101-1 sends a signaling 201 requesting the assignment of IP address with the user identifier (IMS#1) and the service identifier (NAI#1) set to the gateway 106.

Figure 6:
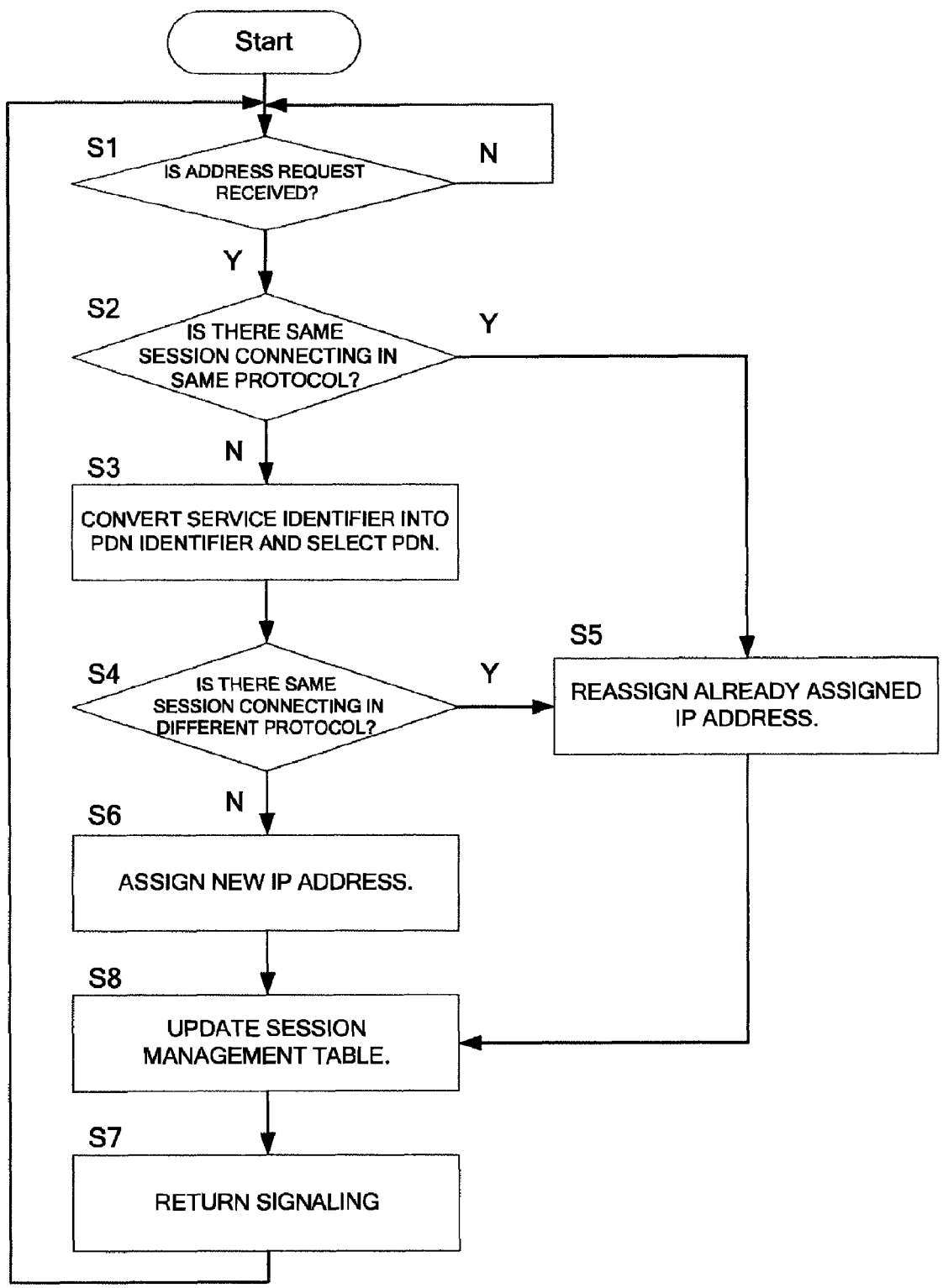
FIG. 6 is one example of a process flow chart in a gateway control part.

The gateway 106 receives the signaling 201, and performs a process as shown in FIG. 6 at step 203 (as will be detailed later). For example, the gateway 106 can obtain a protocol identifier for identifying the protocol for use according to the information included in the signaling 201, and select the service identifier management table of FIG. 8 or 11 in accordance with the protocol identifier. Or, the gateway 106 may select the service identifier management table of FIG. 8 or 11 in accordance with the service identifier included in the signaling. In this case, the gateway 106 converts the service identifier set in the signaling 201 into the PDN identifier with reference to the service identifier (NAL) management table 5041 and the PDN information management table 5044 held in the gateway 106 as the tables to manage the session information as shown in FIGS. 8 and 9, and set beforehand by the operator in the P-GW, selects the PDN for connection, decides the address pool to pay the IP address, assigns the IP address, and creates the connecting session management table 5043, for example, as shown in FIG. 10.

For example, if the acquired service identifier is NAI#1, the gateway 106 judges that the corresponding PDN is PDN#1 by referring to FIG. 9. Also, the gateway 106 judges that the address pool corresponding to the PDN#1 is Pool#1 by referring to FIG. 9. The gateway 106 selects the IP address "A" with Pool#1 from the address pool 5045. The gateway 106 acquires the protocol "MIPv4" from the signaling 201. Thus, the gateway 106 stores the PDN identifier "PDN#1", the IP address "A" and the protocol "MIPv4" corresponding to the user identifier "IMSI#1" and the service identifier "NAI#1" in the connecting session management table 5043, as shown in FIG. 10.

And the gateway 106 sets the IP address assigned to a signaling 202, and sends it to the mobile terminal 101-1.

This embodiment has the same operation as above, except that the protocols used by the FA 104 and the HA 107 are different in the signaling format, such as MIPv4, MIPv6, DSMIPv6 or the like, and is applicable in each protocol of MIPv4, MIPv6, DSMIPv6 or the like.

[Embodiment 2: New Connection: One Example of Connection from the S-GW]

Figure 3:
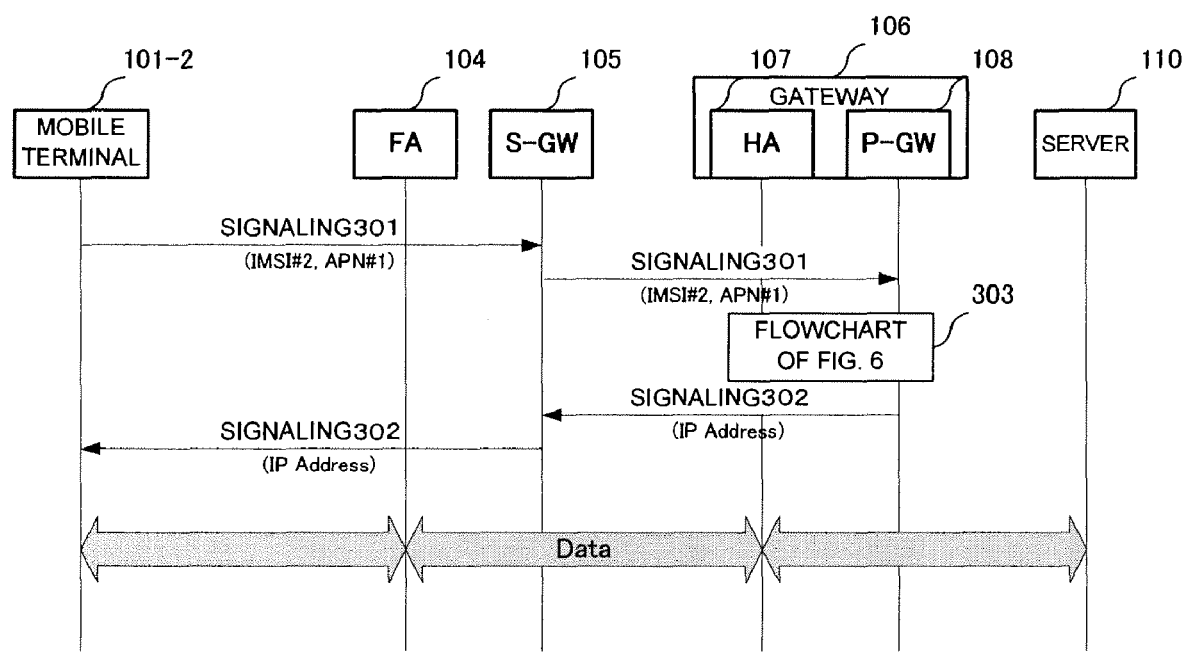
FIG. 3 is one example of new connection: connection from S-GW (embodiment 2).

FIG. 3 shows one example of a call flow in the new connection from the S-GW 105.

The mobile terminal 101-2 sends a signaling 301 requesting the assignment of IP address with the user identifier (IMSI#2) and the service identifier (APN#1) set to the gateway 106.

The gateway 106 receives the signaling 301, and performs a process as shown in FIG. 6 at step 303 (as will be detailed later). For example, the gateway 106 can obtain a protocol identifier for identifying the protocol for use according to the information included in the signaling 301, and select the service identifier management table of FIG. 8 or 11 in accordance with the protocol identifier. Or, the gateway 106 may select the service identifier management table of FIG. 8 or 11 in accordance with the service identifier included in the signaling. In this case, the gateway 106 converts the service identifier set in the signaling 301 into the PDN identifier with reference to the service identifier (APN) management table 5042 and the PDN information management table 5044 held in the gateway 106 as the tables to manage the session information as shown in FIGS. 8 and 9, and set beforehand by the operator in the P-GW, selects the PDN for connection, decides the address pool to assign the IP address, assigns the IP address, and creates the connecting session management table 5043, for example, as shown in FIG. 12.

For example, if the acquired service identifier is APN#1, the gateway 106 judges that the corresponding PDN is PDN#1 by referring to FIG. 10. Also, the gateway 106 judges that the address pool corresponding to the PDN#1 is Pool#1 by referring to FIG. 9. The gateway 106 selects the IP address "B" with Pool#1 from the address pool 5045. The gateway 106 acquires the protocol "GTP" from the signaling 301. Thus, the gateway 106 stores the PDN identifier "PDN#1", the IP address "B" and the protocol "GTP" corresponding to the user identifier "IMSI#2" and the service identifier "APN#1" in the connecting session management table 5043, as shown in FIG. 10.

And the gateway 106 sets the IP address assigned to a signaling 302, and sends it to the mobile terminal 101-2.

This embodiment has the same operation as above, except that the protocols used by the S-GW 105 and the P-GW 108 are different in the signaling format, such as GTP, PMIPv6 or the like, and is applicable in each protocol of GTP, MIPv6 or the like.

[Embodiment 3: Handover: One Example of Movement From the S-GW to the FA]

Figure 4:
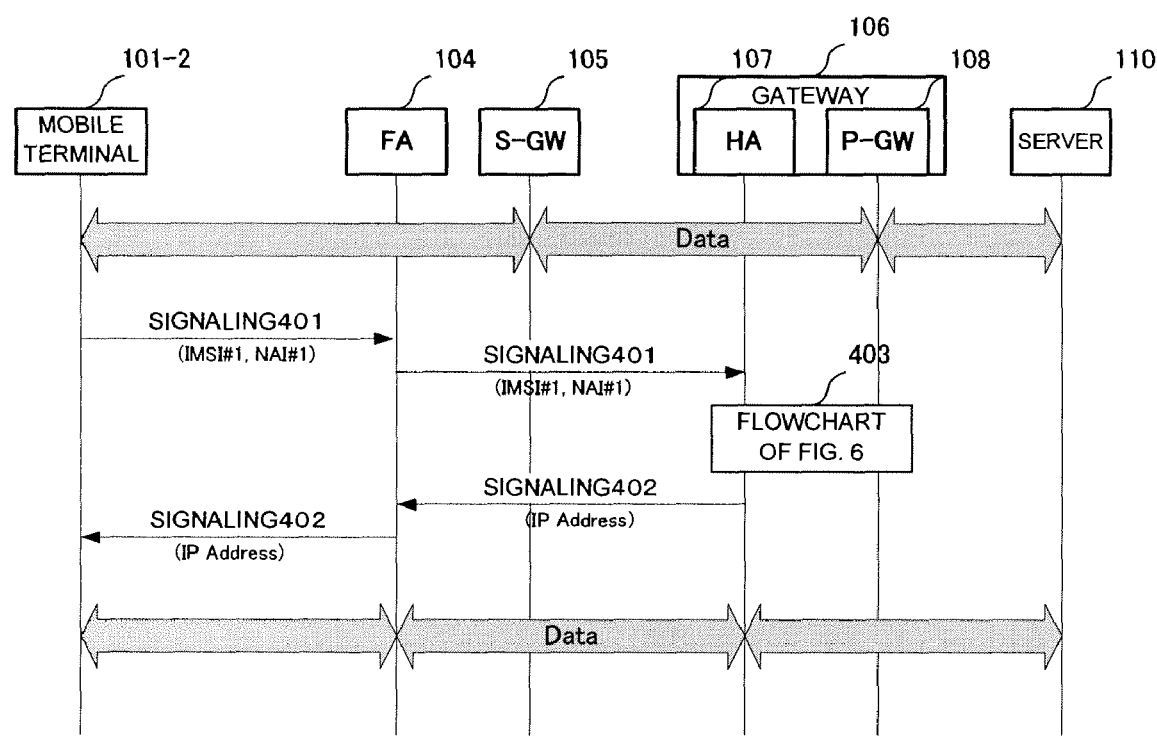
FIG. 4 is one example of handover: movement from S-GW to FA (embodiment 3).

FIG. 4 shows one example of a call flow in making the handover from the S-GW 105 to the FA 104.

The mobile terminal 101-2 moves from the access network 103 accommodated in the S-GW 105 to the access network 102 accommodated in the FA 104, after the embodiment 2, and sends a signaling 401 requesting the assignment of IP address with the user identifier (IMSI#2) and the service identifier (NAI#1) set to the gateway 106 as a new connection process to the access network 102.

The gateway 106 receives a signaling 401, and performs a process as shown in FIG. 6 at step 403 (as will be detailed later). For example, the gateway 106 can obtain a protocol identifier for identifying the protocol for use according to the information included in the signaling 401, and select the service identifier management table of FIG. 8 or 11 in accordance with the protocol identifier. Or, the gateway 106 may select the service identifier management table of FIG. 8 or 11 in accordance with the service identifier included in the signaling. In this case, the gateway 106 converts the service identifier set in the signaling 401 into the PDN identifier with reference to the service identifier (NAI) management table 5041 held in the gateway 106 as a table to manage the session information as shown in FIG. 8, selects the PDN for connection, searches the connecting session management table of FIG. 10 created in the embodiment 2 for the same session with a combination of the user identifier set in the signaling 401 and the PDN identifier after conversion, and upon detecting the same session, assigns the IP address which has been assigned to the concerned session in the embodiment 2.

For example, if the acquired user identifier and service identifier are IMSI#2 and NAI#3, respectively, the gateway 106 judges that the corresponding PDN is PDN#1 by referring to FIG. 8. Also, the gateway 106 specifies the session corresponding to the IMSI#2 and PDN#1 by referring to FIG. 10, judges that the already assigned IP address is "B", and assigned the "B". And the gateway 106 updates the service identifier and the protocol, for example, as shown in FIGS. 10 and 12. That is, the gateway 106 acquires the protocol "MIPv4" from the signaling 401, and stores entry of the PDN identifier "PDN#1", the IP address "B" and the protocol "MIPv4" corresponding to the user identifier "IMSI#2" and the service identifier "NAM" in the connecting session management table 5043.

And the gateway 106 sets the IP address assigned to signaling 402, and sends it to the mobile terminal 101.

This embodiment is applicable in the cases where the protocols used by the FA 104 and the HA 107 are MIPv4, MIPv6, DSMIPv6 or the like, and the protocols used by the S-GW 105 and the P-GW 108 are GTP, PMIPv6 or the like.

[One Example of Gateway Control Part Process Flowchart]

FIG. 6 is one example of a flowchart in the gateway control part according to this embodiment. The control part 505 of the gateway 106 receives an IP address assignment request from the mobile terminal at step S1, and determines whether or not the session with the same protocol as the IP address assignment request of step S1 is held in the connecting session management table 5043 at step S2. For example, the same protocol determination can be made by comparing the information for identifying the protocol included in the header of signaling with FIG. 10. Herein, the control part 505 of the gateway 106 acquires the information for identifying the protocol from the signaling 201. Also, the control part 505 of the gateway 106 may determine the assortment of protocol using the NAI, APN or the like, for example, in extracting the service identifier, or may determine the assortment of protocol such as MIPv4 or GTP with the information for identifying the protocol included in the signaling. The control part 505 can decide which service identifier management table 5041 or 5042 of FIG. 8 or 11 is used in accordance with the determination. In the case where the session with the same protocol as the IP address assignment request of step S1 is held in the connecting session management table 5043, for example, in the case where the gateway 106 receives the IP address request in the signaling of the same protocol MIPv4 in which the same user identifier and the same service identifier are set when the MIPv4 session is held, the control part 505 of the gateway 106 reassigns the already assigned IP address at step S5, and returns the signaling with the IP address set at step S7. Whether or not the information in the signaling includes the user identifier and the service identifier can be discriminated, for example, from the header set for every information in the signaling.

On the other hand, if the session with the same protocol as the IP address assignment request of step S1 is not held, for example, if the gateway receives the IP address request in the signaling of the protocol MIPv4 in which the same user identifier and the same service identifier are set when the session of the protocol MIPv4 is not held, the control part 505 of the gateway 106 converts the service identifier set in the IP address assignment request of step S1 into the PDN identifier by selectively using the service identifier management table of FIG. 8 or 11 in accordance with the assortment of protocol, for example, and decides the PDN for connection at step S3. The control part 505 of the gateway 106 determines whether or not the same connecting session is held in the different protocols by referring to the connecting session management table 5043, for example, as shown in FIG. 10, with a combination of the user identifier set in the IP address assignment request of step S1 and the PDN identifier after conversion of step S3, at step S4. If the same session connecting in the different protocols is held, for example, if the user identifier and the service identifier set in the IP address request of the protocol MIPv4 signaling is coincident with those of another protocol GTP session when the gateway holds the session of another protocol GTP, the control part 505 of the gateway 106 reassigns the already assigned IP address at step S5, updates the session management table 5043 (see FIG. 5) (i.e., rewriting the service identifier and the protocol identification information in the connecting session management table 5043) at step S8, and returns the signaling with the IP address set at step S7.

Also, if the same session connecting in the different protocols is not held in the connecting session management table 5043 at step S4, for example, if the gateway receives the IP address request of the protocol MIPv4 signaling when not holding such session, the control part 505 of the gateway 106 selects the pool identifier corresponding to the PDN identifier after conversion of step S2, using the PDN information management table 5044 as shown in FIG. 9, for example, in accordance with the assortment of protocol, to newly assign the IP address at step S6, updates the session management table at step S8, and returns the signaling with the IP address set at step S7. The address pool 5045 pools a plurality of IP addresses for each address pool identifier, in which one IP address is appropriately selected in accordance with the predetermined sequence or priority.

The other assortments of protocol and access networks may be appropriately used than the above. Also, though the mobile terminal has been described above, other appropriate terminals such as a fixed terminal or a wireless terminal may be used. For the address, the IP address has been described, but other appropriate addresses may be used. Moreover, the invention is not limited to the PDN but may be applicable to the appropriate networks.

What is claimed is:

1. A communication system comprising:
   a first access network, to which a terminal is connected, using a first protocol;
   a second access network, to which a terminal is connected, using a second protocol different from the first protocol;
   a network connected to a server providing a service; and
   a gateway, to which the first and second access networks and the network are connected, for connecting a session with the network and the first or second access network;
   the gateway comprising:
   a first service identifier management table storing a network identifier for common use in the first and second protocols, corresponding to a first service identifier for use in the first protocol to identify a service provided to the terminal from the network;
   a second service identifier management table storing a network identifier for common use in the first and second protocols, corresponding to a second service identifier, which is different kind from the first service identifier, for use in the second protocol;
   a network information management table setting the correspondence between the network identifier and an address pool identifier;
   a connecting session management table storing associated a user identifier, a service identifier, a network identifier, an address and a protocol identification information for a connecting session; and
   a control part for controlling a session with the network and the first or second access network by accessing to the first and second service identifier management table, the network information management table and the connecting session management table;
   wherein the control part of the gateway is configured to:
   receive a signaling including a user identifier, a service identifier and a protocol identification information for identifying a protocol for use and requesting the address assignment, from the terminal;
   search the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;
   when the information of the first connecting session is not stored, convert the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

search the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and when the information of the second connecting session is stored, rewrite the service identifier and the protocol identification information in the information of the second connecting session, and return a signaling in which an address in the information of the second connecting session stored in the connecting session management table is set, to the terminal;

thereby providing a service from the network via the first or second access network to the terminal.

2. The communication system according to claim 1, wherein the gateway further comprises a network information management table setting the correspondence between a network identifier and an address pool identifier, in which, if the information of the second connecting session is not stored, the control part of the gateway configured to:

decide an address pool identifier corresponding to the network identifier, using the network information management table, assign an address from an address pool designated by the address pool identifier, and store the user identifier, the service identifier, the network identifier, the address and the protocol identification information associated in the connecting session management table, and return the signaling with the assigned address to the terminal, thereby providing a service from the network via the first or second access network to the terminal.

3. The communication system according to claim 1, wherein, if the information of the first connecting session is stored in the connecting session management table, the control part of the gateway configured to:

reassign the already assigned address with the information of the concerned connecting session stored in the connecting session management table, to the terminal, and return the signaling with the assigned address, to the terminal, thereby providing the service from the network via the first or second access network to the terminal.

4. The communication system according to claim 1, wherein the control part of the gateway, if receiving a signaling including a user identifier, a first service identifier, and a first protocol identification information for identifying the first protocol for use and requesting an address assignment, from the terminal at the time of new connection, is configured to:

convert the first service identifier to the network identifier by selecting and referring to the first service identifier management table in accordance with the first protocol identification information, decide an address pool identifier corresponding to the network identifier, using the network information management table, assign an address from an address pool designated by the address pool identifier, and store the user identifier, the first service identifier, the network identifier, the address and the first protocol identification information in the connecting session management table associated, and return the signaling with the address, to the terminal, thereby providing the service from the network via the first access network to the terminal.

5. The communication system according to claim 4, wherein the control part of the gateway, if receiving a signaling including a user identifier, a second service identifier and a second protocol identification information for identifying the second protocol for use and requesting an address assignment, from the terminal at the time of handover from the first access network to the second access network, is configured to:

convert the second service identifier to the network identifier by selecting and referring to the second service identifier management table in accordance with the second protocol identification information, search the connecting session management table for an information of the second connecting session with the first protocol identification information and with the same combination of a user identifier and a network identifier as the combination of the user identifier and the network identifier by referring to the connecting session management table, assign the address assigned to the concerned session over the first access network in the information of the connecting session, to the terminal, store the user identifier, the second service identifier, the network identifier, the address and the second protocol identification information associated in the connecting session management table, and return the signaling with the address to the terminal, thereby providing the service from the network via the second access network to the terminal.

6. The communication system according to claim 1, wherein the network identifier is a Packet Data Network (PDN) identifier.

7. The communication system according to claim 2, wherein, if the information of the first connecting session is stored in the connecting session management table, the control part of the gateway configured to:

reassign the already assigned address with the information of the concerned connecting session stored in the connecting session management table, to the terminal, and return the signaling with the assigned address, to the terminal, thereby providing the service from the network via the first or second access network to the terminal.

8. A communication method in a communication system comprising:

a first access network, to which a terminal is connected, using a first protocol;

a second access network, to which a terminal is connected, using a second protocol different from the first protocol;

a network connected to a server providing a service; and a gateway, to which the first and second access networks and the network are connected, for connecting a session with the network and the first or second access network;

the gateway comprising:

a first service identifier management table storing a network identifier for common use in the first and second protocols, corresponding to a first service identifier for use in the first protocol to identify a service provided to the terminal from the network;

a second service identifier management table storing a network identifier for common use in the first and second protocols, corresponding to a second service identifier, which is different kind from the first service identifier, for use in the second protocol;

a network information management table setting the correspondence between the network identifier and an address pool identifier;

a connecting session management table storing associated a user identifier, a service identifier, a network identifier, an address and a protocol identification information for a connecting session; and a control part for controlling a session with the network and the first or second access network by accessing to the first and second service identifier management table, the network information management table and the connecting session management table;

wherein the communication method comprises the control part of the gateway performing the steps:

receiving a signaling including a user identifier, a service identifier and a protocol identification information for identifying a protocol for use and requesting the address assignment, from the terminal;

searching the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;

when the information of the first connecting session is not stored, converting the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

searching the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and when the information of the second connecting session is stored,
  rewriting rewrites the service identifier and the protocol identification information in the information of the second connecting session, and
  returning a signaling in which an address in the information of the second connecting session stored in the connecting session management table is set, to the terminal;

thereby providing a service from the network via the first or second access network to the terminal.

9. The communication method in a communication system according to claim 8, wherein the gateway further comprises a network information management table setting the correspondence between a network identifier and an address pool identifier, in which, if the information of the second connecting session is not stored, the control part of the gateway performs the steps:

deciding an address pool identifier corresponding to the network identifier, using the network information management table, assigning an address from an address pool designated by the address pool identifier, and storing the user identifier, the service identifier, the network identifier, the address and the protocol identification information associated in the connecting session management table, and returning the signaling with the assigned address to the terminal, thereby providing a service from the network via the first or second access network to the terminal.

10. The communication method in a communication system according to claim 8, wherein, if the information of the first connecting session is stored in the connecting session management table, the control part of the gateway performs the steps:

reassigning the already assigned address with the information of the concerned connecting session stored in the connecting session management table, to the terminal, and returning the signaling with the assigned address, to the terminal, thereby providing the service from the network via the first or second access network to the terminal.

11. The communication method in a communication system according to claim 8, wherein the control part of the gateway, if receiving a signaling including a user identifier, a first service identifier, and a first protocol identification information for identifying the first protocol for use and requesting an address assignment, from the terminal at the time of new connection, performs the steps:

converting the first service identifier to the network identifier by selecting and referring to the first service identifier management table in accordance with the first protocol identification information, deciding an address pool identifier corresponding to the network identifier, using the network information management table, assigning an address from an address pool designated by the address pool identifier, and storing the user identifier, the first service identifier, the network identifier, the address and the first protocol identification information in the connecting session management table associated, and returning the signaling with the address, to the terminal, thereby providing the service from the network via the first access network to the terminal.

12. The communication method in a communication system according to claim 8, wherein the control part of the gateway, if receiving a signaling including a user identifier, a second service identifier and a second protocol identification information for identifying the second protocol for use and requesting an address assignment, from the terminal at the time of handover from the first access network to the second access network, performs the steps:

converting the second service identifier to the network identifier by selecting and referring to the second service identifier management table in accordance with the second protocol identification information, searching the connecting session management table for an information of the second connecting session with the first protocol identification information and with the same combination of a user identifier and a network identifier as the combination of the user identifier and the network identifier by referring to the connecting session management table, assigning the address assigned to the concerned session over the first access network in the information of the connecting session, to the terminal, storing the user identifier, the second service identifier, the network identifier, the address and the second protocol identification information associated in the connecting session management table, and returning the signaling with the address to the terminal, thereby providing the service from the network via the second access network to the terminal.

13. The communication method in a communication system according to claim 8, wherein the network identifier is a Packet Data Network (PDN) identifier.

14. The communication method in a communication system according to claim 9, wherein, if the information of the first connecting session is stored in the connecting session management table, the control part of the gateway performs the steps:

reassigning the already assigned address with the information of the concerned connecting session stored in the connecting session management table, to the terminal, and returning the signaling with the assigned address, to the terminal, thereby providing the service from the network via the first or second access network to the terminal.

15. A gateway, to which a first and second access networks and a network are connected, for connecting a session with the network and the first or second access network; the first access network, to which a terminal is connected, using a first protocol; and the second access network, to which a terminal is connected, using a second protocol different from the first protocol;

a network connected to a server providing a service;

the gateway comprising:

a first service identifier management table storing a network identifier for common use in the first and second protocols, corresponding to a first service identifier for use in the first protocol to identify a service provided to the terminal from the network;

a second service identifier management table storing a network identifier for common use in the first and second protocols, corresponding to a second service identifier, which is different kind from the first service identifier, for use in the second protocol;

a network information management table setting the correspondence between the network identifier and an address pool identifier;

a connecting session management table storing associated a user identifier, a service identifier, a network identifier, an address and a protocol identification information for a connecting session; and a control part for controlling a session with the network and the first or second access network by accessing to the first and second service identifier management table, the network information management table and the connecting session management table;

wherein the control part is configured to:

receive a signaling including a user identifier, a service identifier and a protocol identification information for identifying a protocol for use and requesting the address assignment, from the terminal;

search the connecting session management table for information of a first connecting session with the same protocol identification information as the protocol identification information and with the same combination of a user identifier and a service identifier as the combination of the user identifier and the service identifier by referring to the connecting session management table to check presence or absence of the information of the first connecting session;

when the information of the first connecting session is not stored, convert the service identifier to the network identifier for common use in the first and second protocols by selecting and referring to either of the first or second service identifier management table, depending on whether the protocol identification information is the first protocol or second protocol identifier, or whether the service identifier is the first service identifier or second service identifier;

search the connecting session management table for information of the second connecting session with the different protocol identification information from the protocol identification information and with the same combination of a user identifier and a network identifier as the combination of the user identifier and the network identifier by referring to the connecting session management table to check presence or absence of the information of the second connecting session; and when the information of the second connecting session is stored, rewrite the service identifier and the protocol identification information in the information of the second connecting session, and return a signaling in which an address in the information of the second connecting session stored in the connecting session management table is set, to the terminal;

thereby providing a service from the network via the first or second access network to the terminal.

16. The gateway according to claim 15, wherein the gateway further comprises a network information management table setting the correspondence between a network identifier and an address pool identifier, in which, if the information of the second connecting session is not stored, the control part is configured to:

decide an address pool identifier corresponding to the network identifier, using the network information management table, assigning an address from an address pool designated by the address pool identifier, and storing the user identifier, the service identifier, the network identifier, the address and the protocol identification information associated in the connecting session management table, and return the signaling with the assigned address to the terminal, thereby providing a service from the network via the first or second access network to the terminal.

17. The gateway according to claim 15, wherein, if the information of the first connecting session is stored in the connecting session management table, the control part is configured to:

reassign the already assigned address with the information of the concerned connecting session stored in the connecting session management table, to the terminal, and return the signaling with the assigned address, to the terminal, thereby providing the service from the network via the first or second access network to the terminal.

18. The gateway according to claim 15, wherein the control part, if receiving a signaling including a user identifier, a first service identifier, and a first protocol identification information for identifying the first protocol for use and requesting an address assignment, from the terminal at the time of new connection, is configured to:
- convert the first service identifier to the network identifier by selecting and referring to the first service identifier management table in accordance with the first protocol identification information,
- decide an address pool identifier corresponding to the network identifier, using the network information management table, assign an address from an address pool designated by the address pool identifier, and store the user identifier, the first service identifier, the network identifier, the address and the first protocol identification information in the connecting session management table associated, and
- return the signaling with the address, to the terminal,
- thereby providing the service from the network via the first access network to the terminal.

19. The gateway according to claim 15, wherein the control part, if receiving a signaling including a user identifier, a second service identifier and a second protocol identification information for identifying the second protocol for use and requesting an address assignment, from the terminal at the time of handover from the first access network to the second access network, is configured to:
- convert the second service identifier to the network identifier by selecting and referring to the second service identifier management table in accordance with the second protocol identification information,
- search the connecting session management table for an information of the second connecting session with the first protocol identification information and with the same combination of a user identifier and a network identifier as the combination of the user identifier and the network identifier by referring to the connecting session management table, assign the address assigned to the concerned session over the first access network in the information of the connecting session, to the terminal,
- store the user identifier, the second service identifier, the network identifier, the address and the second protocol identification information associated in the connecting session management table, and
- return the signaling with the address to the terminal,
- thereby providing the service from the network via the second access network to the terminal.

20. The gateway according to claim 15, wherein the network identifier is a Packet Data Network (PDN) identifier.

* * * * *